United States Patent
Lang

(10) Patent No.: US 8,308,502 B2
(45) Date of Patent: Nov. 13, 2012

(54) BREAK AWAY STARTER TERMINAL

(75) Inventor: Chris Lang, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 182 days.

(21) Appl. No.: 12/907,212

(22) Filed: Oct. 19, 2010

(65) Prior Publication Data
US 2012/0090910 A1    Apr. 19, 2012

(51) Int. Cl.
*H01R 13/58*    (2006.01)
(52) U.S. Cl. .......................................... 439/475; 439/34
(58) Field of Classification Search .................. 439/475, 439/34, 923
See application file for complete search history.

(56) References Cited

U.S. PATENT DOCUMENTS

| | | | | |
|---|---|---|---|---|
| 3,134,932 | A | * | 5/1964 | Ray .................................. 335/257 |
| 4,195,897 | A | * | 4/1980 | Plevjak ............................ 439/507 |
| 4,581,504 | A | | 4/1986 | Hamel, Sr. |
| 4,668,874 | A | | 5/1987 | Cresap |
| 4,863,397 | A | * | 9/1989 | Hatch, Jr. ....................... 439/475 |
| 5,494,010 | A | * | 2/1996 | Niimi et al. ................ 123/179.25 |
| 5,535,842 | A | | 7/1996 | Richter et al. |
| 5,818,121 | A | | 10/1998 | Krappel et al. |
| 5,855,443 | A | * | 1/1999 | Faller et al. ....................... 403/2 |
| 5,877,563 | A | | 3/1999 | Krappel et al. |
| 6,232,568 | B1 | | 5/2001 | Hasegawa et al. |
| 6,843,157 | B2 | | 1/2005 | Hamilton et al. |

* cited by examiner

*Primary Examiner* — Xuong Chung Trans
(74) *Attorney, Agent, or Firm* — Rankin, Hill & Clark LLP

(57) ABSTRACT

An electrical arrangement for a motor vehicle includes a starter cable electrically connected with a vehicle battery, a terminal head conductor electrically connected with the starter cable, a terminal base conductor electrically connected with a starter motor, and an electrically nonconductive terminal enclosure defining a cavity in which the terminal head conductor and the terminal base conductor are positioned. The vehicle battery is electrically connected with the starter motor when the terminal head conductor contacts the terminal base conductor in the cavity. The terminal enclosure includes a weakened section offset from the terminal head conductor such that breaking of the terminal enclosure at the weakened section to form a free edge of the terminal enclosure and disconnection of the terminal head conductor from the terminal base conductor results in the terminal head conductor remaining in the cavity and spaced from the free edge.

20 Claims, 2 Drawing Sheets

BREAK AWAY STARTER TERMINAL

BACKGROUND

In most vehicles, a starter cable having a large diameter wire connects the vehicle battery to a starter motor. This large diameter wire provides the starter motor with electricity to start the vehicle. The starter motor requires a large amount of electrical current to turn over the vehicle, and for this reason the starter cable is unfused.

During a crash event where a front end of the vehicle is damaged, objects in the engine compartment can contact and break off the top of the starter motor where the starter cable attaches. When this happens, the broken portion of a starter motor terminal, which is connected with the starter cable, is exposed and can short on metal objects in the engine compartment. Because the starter cable is unfused, it will remain live as long as there is power from the vehicle battery. This situation is undesirable.

SUMMARY

An example of an electrical arrangement for a motor vehicle that can overcome at least one of the aforementioned shortcomings includes a starter cable electrically connected with a vehicle battery, a terminal head conductor electrically connected with the starter cable, a terminal base conductor electrically connected with a starter motor, and an electrically nonconductive terminal enclosure defining a cavity in which the terminal head conductor and the terminal base conductor are positioned. The vehicle battery is electrically connected with the starter motor when the terminal head conductor contacts the terminal base conductor in the cavity. The terminal enclosure includes a weakened section offset from the terminal head conductor such that breaking of the terminal enclosure at the weakened section to form a free edge of the terminal enclosure and disconnection of the terminal head conductor from the terminal base conductor results in the terminal head conductor remaining in the cavity and spaced from the free edge.

An example of a starter motor that can overcome at least one of the aforementioned shortcomings includes a motor winding, a terminal base conductor electrically connected with the motor winding, an electrically insulative terminal base surrounding the terminal base conductor, an electrically insulative terminal head extending from the terminal base, and a terminal head conductor contacting the terminal base conductor. The terminal head defines a cavity and also includes a weakened section. The terminal head conductor is in the cavity contacting the terminal base conductor and is spaced from the weakened section.

A vehicle arrangement that can overcome at least one of the aforementioned shortcomings includes a vehicle frame, a vehicle battery, a starter motor, a terminal enclosure, a terminal base conductor, a terminal head conductor, a starter cable, and a weakened section in the terminal enclosure. The vehicle frame includes an electrically conductive frame member. The vehicle battery mounts to the vehicle frame. The starter motor includes a starter motor housing for housing a winding. The starter motor housing is mounted to the vehicle frame. The terminal enclosure extends from the starter motor housing. The terminal enclosure includes a cavity. The terminal base conductor electrically connects with the winding and includes a contact disposed in the cavity. The terminal head conductor electrically connects with the vehicle battery and is disposed in the cavity for contacting the contact of the terminal base conductor for supplying electrical power from the vehicle battery to the starter motor. The starter cable electrically connects with the vehicle battery and the terminal head conductor. The weakened section is in the terminal enclosure and is located so as to space the terminal head conductor from a free edge of the cavity in the terminal enclosure when the terminal enclosure breaks at the weakened section and the terminal head conductor no longer contacts the terminal base conductor.

DETAILED DESCRIPTION

Figure 1:
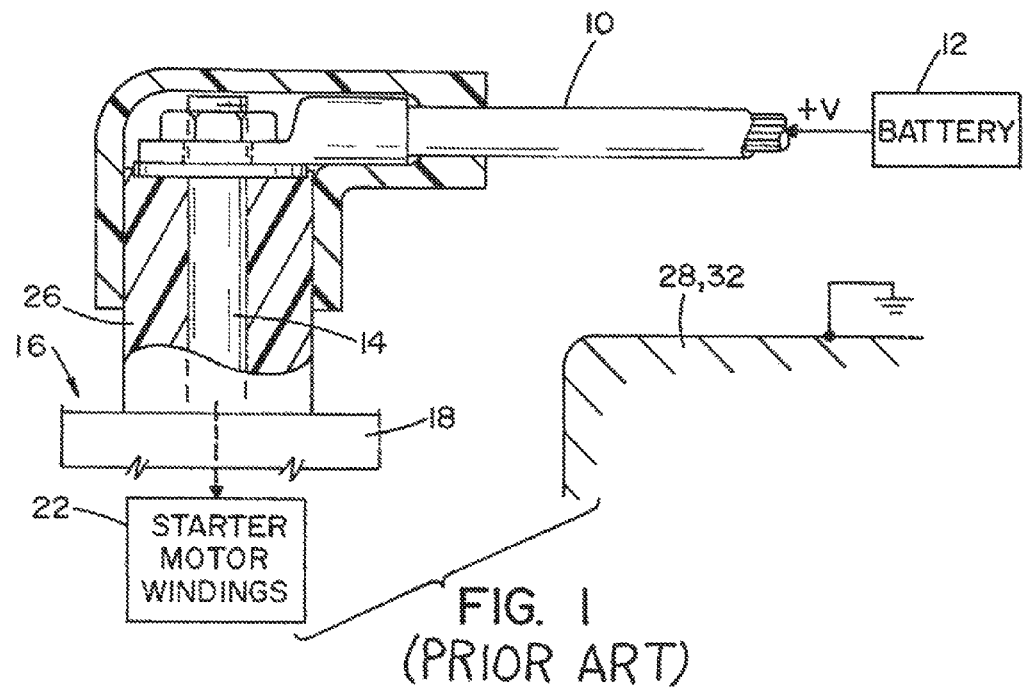
FIG. 1 is a schematic depiction of a vehicle arrangement where a starter cable is mechanically and electrically connected to a terminal of a starter motor.

FIG. 1 schematically depicts an electrical arrangement in a motor vehicle including a starter cable 10 electrically connected with a vehicle battery 12 (depicted schematically) and a terminal 14 of a starter motor 16 (depicted schematically). The terminal 14 extends outwardly from a housing 18 of the starter motor 16 where the housing 18 can house a solenoid and/or starter motor windings 22 (depicted schematically in FIG. 1). The starter cable 10 is unfused between the battery 12 and the terminal 14 because of the large amount of current needed to turn over the vehicle. A terminal enclosure 26, which is made from an electrically nonconductive material, surrounds the terminal 14 to isolate the terminal from other electrically conductive components.

Figure 2:
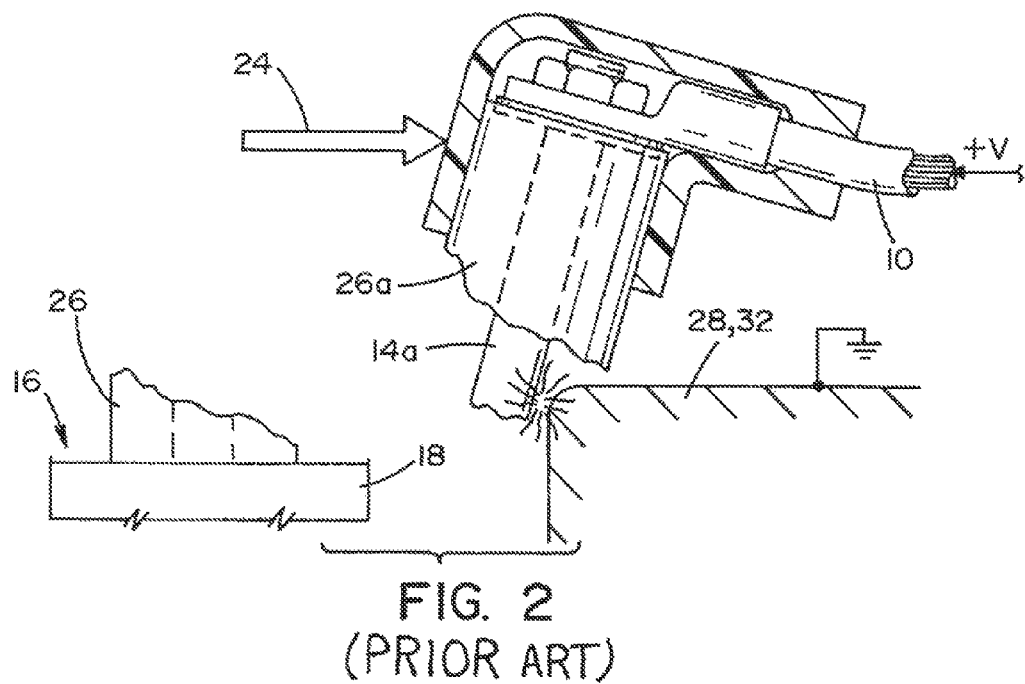
FIG. 2 is a schematic depiction of the vehicle arrangement shown in FIG. 1 after an impact, which results in the starter terminal breaking from the starter motor and contacting an electrically conductive metal object or an electrically conductive frame member.

FIG. 2 schematically depicts the electrical arrangement depicted in FIG. 1 after a crash event where a front end of the vehicle is damaged, or another event where the terminal 14 is struck by an object. A force in the direction of arrow 24 has been applied to the terminal 14 resulting in the terminal and the enclosure 26 surrounding the terminal breaking from the motor housing 18. Since the starter cable 10 is unfused, the broken section 14a of the terminal that is connected with the starter cable 10 remains live, i.e. current flows to the terminal, as long as there is power from the battery 12. Moreover, the broken section 14a can extend outwardly from the broken section 26a of the terminal enclosure. Should the broken section 14a of the terminal contact a grounded metal object 28 in the engine compartment or a portion of the vehicle frame 32, current could flow from the battery 12 through the starter cable and through the metal object 28 or the vehicle frame 32. Such an occurrence is undesirable.

Figure 3:
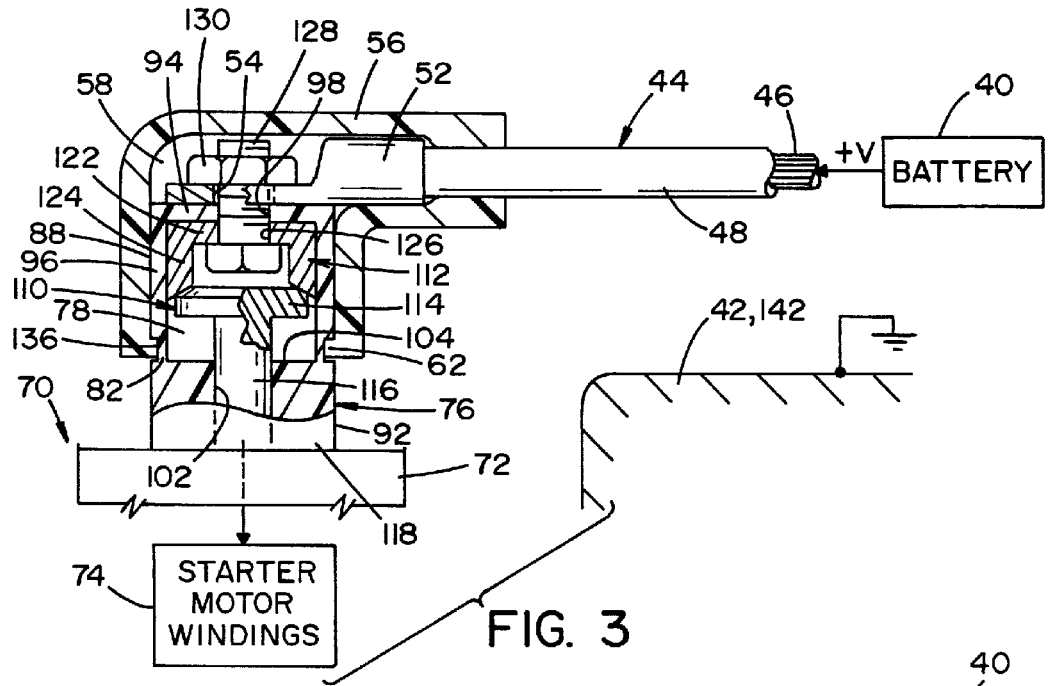
FIG. 3 is an alternative vehicle arrangement showing a starter cable electrically connected with a starter motor.
Figure 4:
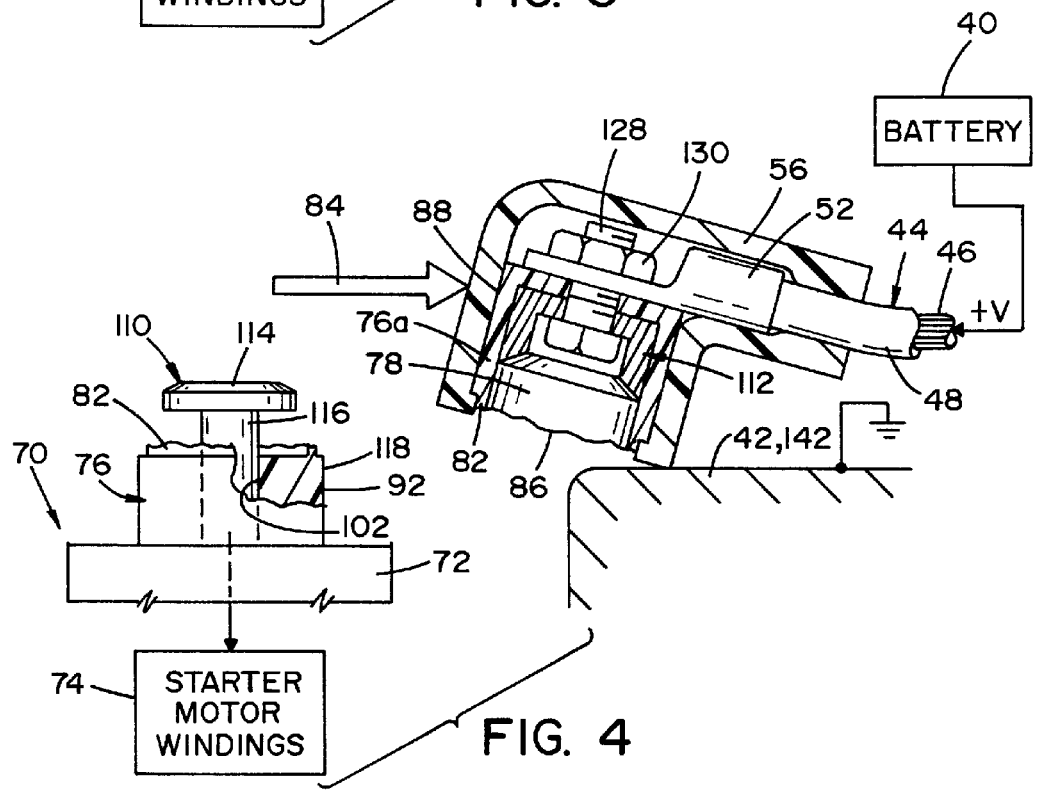
FIG. 4 schematically depicts the vehicle arrangement shown in FIG. 3 after an impact resulting in the starter cable disconnecting from the starter motor.

FIGS. 3 and 4 depict an alternative electrical arrangement in a motor vehicle. The electrical arrangement in FIGS. 3 and 4 includes a vehicle battery 40 (depicted schematically) that mounts to a vehicle frame 42. The mounting location for the battery 40 is not shown; however, the manner in which the battery mounts to the vehicle frame 42 is known to persons of ordinary skill in the art. The vehicle frame 42 is electrically conductive and includes an electrically conductive frame member that is grounded.

The electrical arrangement also includes a starter cable 44 electrically connected with the vehicle battery 40. The starter cable 44 includes a large diameter wire 46 covered by a sheath 48. The starter cable 44 also includes a terminal ring 52, which is electrically conductive, and includes a hole 54. The starter cable 44 is unfused between the battery 40 and the terminal ring 52. A starter terminal cover 56, which is made from an electrically insulative material, covers the terminal ring 52. The starter terminal cover 56 is hood-shaped to define a cavity 58 in which the terminal ring 52 is disposed. The starter terminal cover 56 includes an inwardly protruding ridge 62 at a distal (lower) end of the starter terminal cover.

The electrical arrangement also includes a starter motor 70 (depicted schematically) including a starter motor housing 72 (only a portion of which is shown) for housing a winding 74 (depicted schematically) as well as other components of the starter motor such as a solenoid and other components found in conventional starter motors. The start motor housing 72 is made from an electrically nonconductive material and mounts in the vehicle in a conventional manner.

The electrical arrangement also includes a terminal enclosure 76 extending from the starter motor housing 72. The terminal enclosure 76 differs from the terminal enclosure 26 shown in FIG. 1 in that the terminal enclosure 76 in FIG. 3 includes a cavity 78. The terminal enclosure 76 also includes a weakened section 82. As seen in FIG. 4, the terminal enclosure 76 is configured and designed such that a force on the terminal enclosure 76 in the direction of arrow 84 results in the terminal enclosure 76 breaking at the weakened section 82 to form a free edge 86 of the terminal enclosure. The force could be the result of a crash event where a front end of the vehicle is damaged, or another event where the terminal enclosure 76 is struck by an object.

In FIG. 3, the terminal enclosure 76 includes a terminal head 88 and a terminal base 92. As illustrated, the terminal head 88 is substantially cup-shaped and includes a base 94 and a side wall 96 depending from a perimeter of the base to define the cavity 78. The base 94 of the terminal head 88 includes a passage 98. The terminal base 92 also includes a passage 102 and a planar upper (per the orientation shown in FIG. 3) surface 104 that faces toward the cavity 78 operating as a boundary surface for the cavity.

The electrical arrangement also includes a terminal base conductor 110 electrically connected with the motor winding 74 and a terminal head conductor 112 electrically connected with the vehicle battery 40. As illustrated, the terminal head conductor 112 is a female electrical connector and the terminal base conductor 110 is a male electrical connector; however, each conductor could take an alternative configuration. As illustrated, the terminal base conductor 110 includes a contact 114 disposed in the cavity 78 and a shaft portion 116. The contact portion 114 is disposed at a distal end of the shaft portion 116. The terminal base 92 includes the passage 102, which receives the shaft portion 116. The terminal base 92 is substantially filled with electrically non-conductive material from an exterior surface 118 of the terminal base 92 to the shaft portion 116 of the terminal base conductor. In other words, the terminal base 92, which is made from an electrically insulative material, surrounds the shaft portion 116 of the terminal base conductor 110 and contacts an outer surface thereof. The passage 102 in the terminal base 92 is nearly identical in cross section to a portion, e.g. the shaft 116, of the terminal base conductor 110 surrounded by the terminal base.

The terminal head conductor 112, as illustrated, is substantially cup-shaped so as to include a base 122 and a side wall 124 depending in a first direction from the base. The base 122 of the terminal head conductor 112 also includes an opening 126. The electrical arrangement also includes a conductive fastener 128 that electrically and mechanically connects the starter cable 44 with the terminal head conductor 112. The fastener 128 extends through the passage 126 in the base 122 of the terminal head conductor 112, through the passage 98 in the base 94 of the terminal head 88, and through the hole 54 in the terminal ring 52 to electrically and mechanically connect the terminal head conductor 112 to the starter cable 44, and thus electrically connect the terminal head conductor 112 with to the battery 40. A nut 130 threads to the fastener 128, which retains the terminal head conductor 112 within the cavity 78 and against the base 94 of the terminal head 88. The terminal head conductor 112 can be made from a spring-like resilient metal material so that adequate contact can be made between the terminal head conductor 112 and the terminal base conductor 110 for providing electrical power from the battery 40 to the starter motor 70.

As illustrated, the weakened section 82 of the terminal enclosure 76 is located in the terminal head 88 adjacent the terminal base 92 near the boundary surface 104 of the terminal base. Since the terminal base 92 is made from a solid piece of material between the outer surface 118 of the terminal base 92 and the shaft portion 116 of the terminal base conductor 116, providing the weakened section in the terminal head 88 adjacent the terminal base 92 provides an easy breaking location to accommodate stresses in the terminal head 88. The thinner wall section of the terminal head 88 cannot accommodate the same stresses as the thicker wall section of the terminal base 92 without breaking. In the illustrated embodiment, the weakened section 82 is made by a relief notch 136 formed in the side wall 96 of the terminal head 88. The relief notch 136 can be continuous around or intermittently formed around the periphery of the terminal head 88. Additionally, the relief notch 136 can receive the inwardly protruding ridge 62 formed at the distal end of the starter terminal cover 56.

The weakened section 82 is offset from the terminal head conductor 112 such that breaking of the terminal enclosure 76 at the weakened section 82 to form the free edge 86 and disconnection of the terminal head conductor 112 from the terminal base conductor 110 results in the terminal head conductor 112 remaining in the cavity 78 and spaced from the free edge 86. As a result, even with electrical current flowing from the battery 40 through the starter cable 44, the terminal head conductor 112 is spaced from the electrically conductive frame member 42 or an electrically conductive metal object 142, both of which can be grounded.

As stated above, the weakened section 82 is located in the terminal enclosure 76 so as to space the terminal head conductor 112 from the free edge 86 of the cavity 78 in the terminal enclosure when the terminal enclosure breaks at the weakened section 82 and the terminal head conductor no longer contacts the terminal base conductor 110. In the depicted electrical arrangement, the terminal enclosure 76 is offset a predetermined distance from the electrically conductive frame member 42 or the electrically conductive metal object 142 connected with the electrically conductive frame member. For example, the starter motor 70 can be mounted in the engine compartment of the vehicle, and the electrically conductive frame member 42 or the electrically conductive metal object 142 would be offset from the terminal enclosure. An impact force, for example as a result of a front end collision, on the terminal enclosure 76 in the direction 84 toward the electrically conductive frame member 42 or the electrically conductive metal object 142 and sufficient to break the terminal enclosure at the weakened section 82 can result in a broken section 76a of the terminal enclosure 76 contacting the electrically conductive frame member 42 or the electrically conductive metal object 142. The terminal head conductor 112 is located in the cavity 78 offset from the weakened section 82 a predetermined distance such that the terminal head conductor 112 does not contact the electrically conductive frame member 42 or the electrically conductive metal object 142 when the broken section 76a of the terminal enclosure 76 contacts the electrically conductive frame member or the electrically conductive metal object. Instead, the electrically non-conductive starter terminal cover 56 and/or the electrically non-conductive terminal head 88 contacts the electrically conductive frame member 42 or the electrically conductive metal object 142. The fastener 128 retains the terminal head conductor 112 within the cavity 78 spaced from the free edge 86. As such current does not flow from the battery 40 into the electrically conductive frame member 42 or the electrically conductive metal object 142 even when the battery 40 still has power.

An electrical arrangement, a starter motor, and a vehicle arrangement have been described above with particularity. Modifications and alterations will occur to those upon reading and understanding the preceding detailed description. The invention, however, is not limited to only the embodiment described above. Instead, the invention is broadly defined by the appended claims and the equivalents thereof.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An electrical arrangement for a motor vehicle comprising:
   a starter cable electrically connected with a vehicle battery;
   a terminal head conductor electrically connected with the starter cable;
   a terminal base conductor electrically connected with a starter motor; and
   an electrically nonconductive terminal enclosure defining a cavity in which the terminal head conductor and the terminal base conductor are positioned, wherein the vehicle battery is electrically connected with the starter motor when the terminal head conductor contacts the terminal base conductor in the cavity, wherein the terminal enclosure includes a weakened section offset from the terminal head conductor such that breaking of the terminal enclosure at the weakened section to form a free edge of the terminal enclosure and disconnection of the terminal head conductor from the terminal base conductor results in the terminal head conductor remaining in the cavity and spaced from the free edge.

2. The arrangement of claim 1, wherein the terminal enclosure includes a terminal head and a terminal base, the terminal head being substantially cup-shaped including a base and a side wall depending from a perimeter of the base to define the cavity.

3. The arrangement of claim 2, further comprising a conductive fastener electrically and mechanically connecting the starter cable with the terminal head conductor, wherein the base of the terminal head includes a passage and the fastener extends through the passage.

4. The arrangement of claim 2, wherein the terminal base conductor includes a shaft portion and a contact portion at a distal end of the shaft portion and located within the cavity, wherein the contact portion contacts the terminal head conductor, wherein the terminal base includes a passage that receives the shaft portion and the terminal base is substantially filled with electrically nonconductive material from an exterior surface to the shaft portion.

5. The arrangement of claim 4, wherein the weakened section is located in the terminal head adjacent the terminal base.

6. The arrangement of claim 5, wherein the weakened section is a relief notch formed in the side wall of the terminal head.

7. The arrangement of claim 6, wherein the relief notch is continuous around a periphery of the terminal head.

8. The arrangement of claim 7, further comprising an electrically insulative starter terminal cover, the starter terminal cover having a substantial hood shape and an inwardly protruding ridge, wherein the relief notch receives the ridge.

9. A starter motor comprising:
   a motor winding;
   a terminal base conductor electrically connected with the motor winding;
   an electrically insulative terminal base surrounding the terminal base conductor;
   an electrically insulative terminal head extending from the terminal base, the terminal head defining a cavity and also including a weakened section; and
   a terminal head conductor in the cavity contacting the terminal base conductor, wherein the terminal head conductor is spaced from the weakened section.

10. The starter motor of claim 9, further comprising a motor housing, wherein the terminal base extends outwardly from the motor housing.

11. The starter motor of claim 9, wherein the terminal base is a substantially solid piece of electrically insulative material having a passage nearly identical in cross section to a portion of the terminal base conductor surrounded by the terminal base.

12. The starter motor of claim 11, wherein the weakened section begins adjacent a boundary surface of the terminal base facing toward the cavity.

13. The starter motor of claim 12, wherein the weakened section is a relief notch formed in the terminal head.

14. The starter motor of claim 9, wherein the terminal head includes a base and a side wall depending in a first direction from the base, wherein the terminal head conductor is spaced from the weakened section in a direction parallel to the first direction.

15. The starter motor of claim 9, wherein the terminal head conductor is a female electrical connector and the terminal base conductor is a male electrical connector.

16. A vehicle arrangement comprising:
   a vehicle frame including an electrically conductive frame member;
   a vehicle battery mounted to the vehicle frame;
   a starter motor including a starter motor housing for housing a winding, and the starter motor housing being mounted to the vehicle frame;
   a terminal enclosure extending from the starter motor housing, the terminal enclosure including a cavity;
   a terminal base conductor electrically connected with the winding and including a contact disposed in the cavity;
   a terminal head conductor electrically connected with the vehicle battery and being disposed in the cavity for contacting the contact of the terminal base conductor for supplying electrical power from the vehicle battery to the starter motor;
   a starter cable electrically connected with the vehicle battery and the terminal head conductor; and a weakened section in the terminal enclosure, the weakened section being located so as to space the terminal head conductor from a free edge of the cavity in the terminal enclosure when the terminal enclosure breaks at the weakened section and the terminal head conductor no longer contacts the terminal base conductor.

17. The vehicle arrangement of claim 16, further comprising an electrically insulative starter terminal cover, the starter terminal cover having a substantial hood shape and receiving the terminal enclosure, wherein the terminal enclosure is offset a predetermined distance from the electrically conductive frame member or an electrically conductive metal object connected with the electrically conductive frame member, and an impact force on the terminal enclosure in a direction toward the electrically conductive frame member or the electrically conductive metal object and sufficient to break the terminal enclosure at the weakened section results in a broken section of the terminal enclosure or the starter terminal cover contacting the electrically conductive frame member or the electically conductive metal object.

18. The vehicle arrangement of claim 17, wherein the terminal head conductor is located in the cavity offset from the weakened section a predetermined distance such that the terminal head conductor does not contact the electrically conductive frame member or the electrically conductive metal object when the broken section of the terminal enclosure or the starter terminal cover contacts the electrically conductive frame member or the electrically conductive metal object.

19. The vehicle arrangement of claim 16, wherein the weakened section is a relief notch formed in a side wall of the terminal head.

20. The arrangement of claim 19, wherein the relief notch is continuous around a periphery of the terminal head.

* * * * *